July 14, 1936.　　F. I. STEELE　　2,047,392
GEAR SHIFT MECHANISM
Filed Nov. 17, 1933　　3 Sheets-Sheet 1
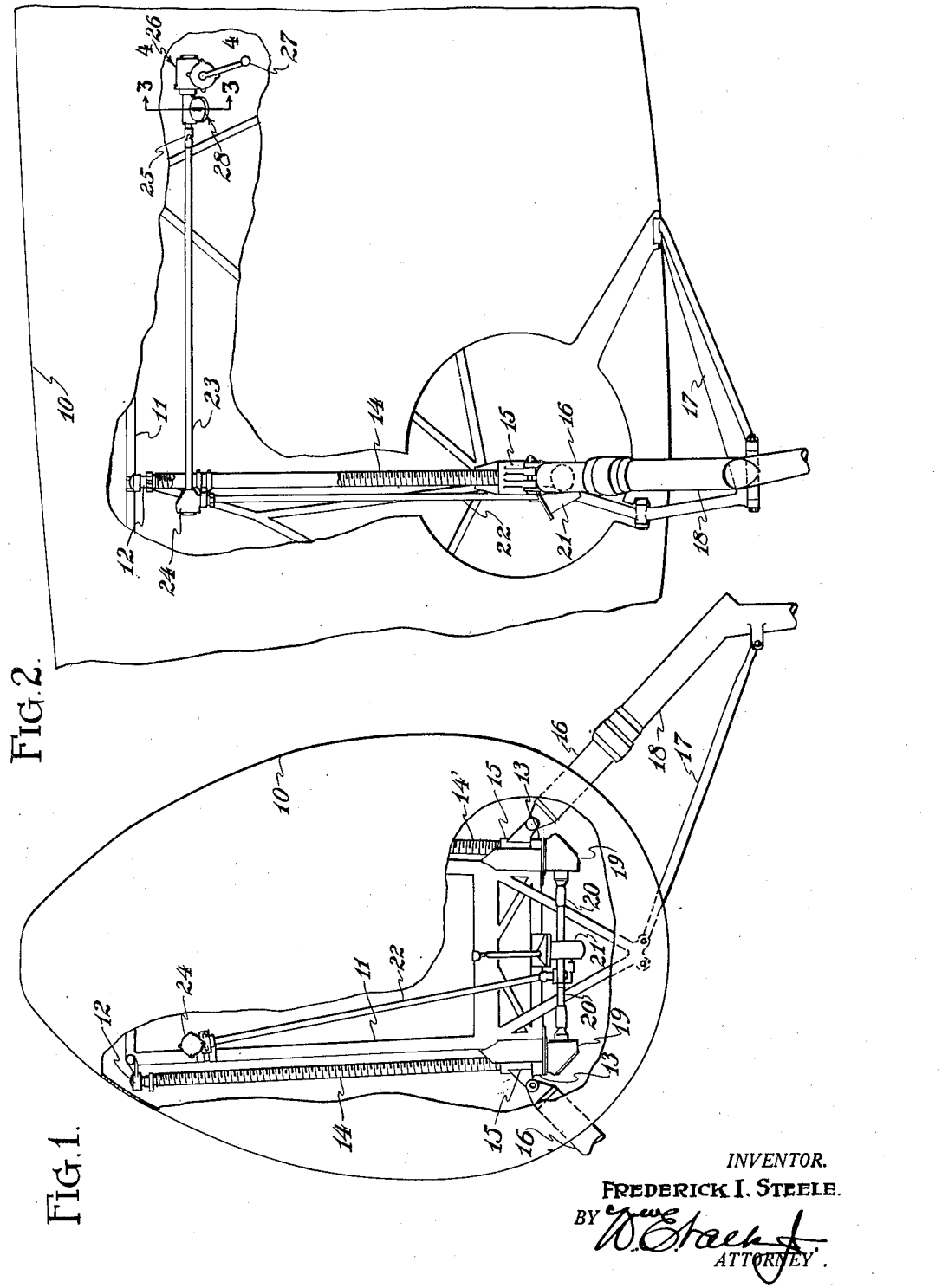
INVENTOR.
FREDERICK I. STEELE.
BY
ATTORNEY.

July 14, 1936.  F. I. STEELE  2,047,392
GEAR SHIFT MECHANISM
Filed Nov. 17, 1933  3 Sheets-Sheet 2

INVENTOR.
FREDERICK I. STEELE.
BY
ATTORNEY.

July 14, 1936.  F. I. STEELE  2,047,392
GEAR SHIFT MECHANISM
Filed Nov. 17, 1933  3 Sheets-Sheet 3

INVENTOR.
FREDERICK I. STEELE.
BY
ATTORNEY.

Patented July 14, 1936

2,047,392

UNITED STATES PATENT OFFICE 2,047,392

GEAR SHIFT MECHANISM

Frederick I. Steele, Kenmore, N. Y., assignor to Curtiss Aeroplane & Motor Company, Inc., a corporation of New York Application November 17, 1933, Serial No. 698,453

3 Claims. (Cl. 244—2)

This invention relates to aircraft having retractable landing gears, and is more particularly concerned with improvements in the mechanism for retracting and extending such landing gears.

Since more and more modern aircraft have been equipped with retractable landing gears, certain problems have arisen in the operation of the landing gears, among which is the factor of speed with which they may be extended and retracted—particularly is it necessary to provide mechanism for extending them rapidly. The time element for retracting the gear is not so important since, after the airplane takes off, the pilot may effect the retraction at leisure. If, however, he is called upon to make a forced landing, it is obviously essential that the landing gear be extended in the least possible time. Ordinarily, landing gears are so constructed that the weight of their parts may assist materially in their extension— during retraction, however, the weight of such parts, and the resistance of air and mechanical movements must be overcome. It is an objective of this invention, therefore, to provide a mechanism for retracting and extending landing gears which allows of rapid extension of the landing gears, while retraction may be accomplished more slowly.

A related object is to provide a mechanism which will permit of a relatively large mechanical advantage in retracting the landing gear to overcome its weight and frictional forces, while providing a relatively small mechanical advantage in lowering the landing gear, since in the latter case, the weight of the gear itself assists materially in its extension.

A further object is to provide an operating shaft or member which may be rotated at substantially a uniform speed in one direction for rapid extension of the landing gear, and may be rotated at substantially the same speed in the opposite direction for slowly retracting the landing gear.

A further object is to combine the above mentioned retracting mechanism with a retractable landing gear of the irreversible type.

Still another object of the invention is to provide a change-speed gear set having high and low ratios, the change in speed being accomplished automatically upon initiation of rotation of a driving or operating member thereof.

Still another object is to provide an indicating device positively actuated by the retracting and extending mechanism for showing at all times the state of extension or retraction of the landing gear.

Broadly, my invention comprises a shaft rotatable in either direction and connected to the landing gear, rotation of the shaft in one direction effecting retraction, and rotation in the other direction effecting extension thereof. Said shaft carries a pair of rigidly mounted gears of different size. A lay shaft is arranged parallel with the first shaft and carries a pair of loosely mounted gears in constant mesh with the gears of the first shaft. Each of the lay shaft gears carries one element of a one-way dog clutch. Loosely mounted on the lay shaft is a helical gear of screw-like conformation, carrying at either end thereof one-way clutch elements adapted to coact with the complementary clutch elements of the lay shaft gears. Each clutch assembly is organized for driving relationship in opposite sense to that of the other. An operating member, carrying a worm or the like engageable with the helical gear, is organized to be turned in either direction, either manually or by power means. Upon rotation of the operating member in one direction, the helical gear is first translated and then rotated to effect engagement of one of the clutch assemblages. Continued rotation of the operating member then drives the corresponding lay shaft gear and the landing gear shaft. Reverse rotation of the operating member effects translation of the helical gear in the opposite direction to cause engagement of the other clutch assemblage, whereupon reverse driving of the landing gear shaft is effected through the second gear set. As each gear set is arranged with a different ratio, opposite rotation of the operating member, the speed of rotation in either direction being relatively constant, may be obviously organized to effect retraction of the landing gear at relatively low speed with a considerable mechanical advantage, while extension of the landing gear is effected at relatively high speed with a relatively low mechanical advantage.

For a detailed understanding of the invention, reference may be made to the drawings and to the description following, in which similar numbers indicate similar parts, and in which:

Fig. 1 is a front elevation, partly broken away, of an aircraft fuselage, showing operating means for a landing gear and showing diagrammatically, the mechanism of my invention;

Fig. 2 is a side elevation of a portion of an aircraft, partly broken away, to show the landing gear structure and the location of the mechanism of this invention;

Figure 3:
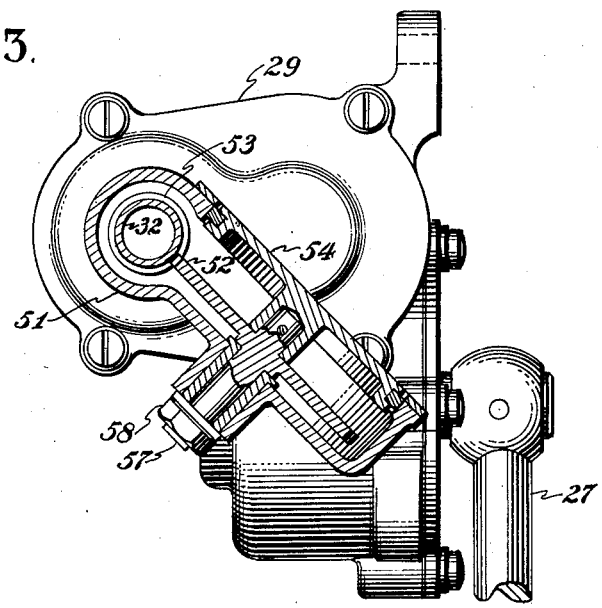
Figure 4:
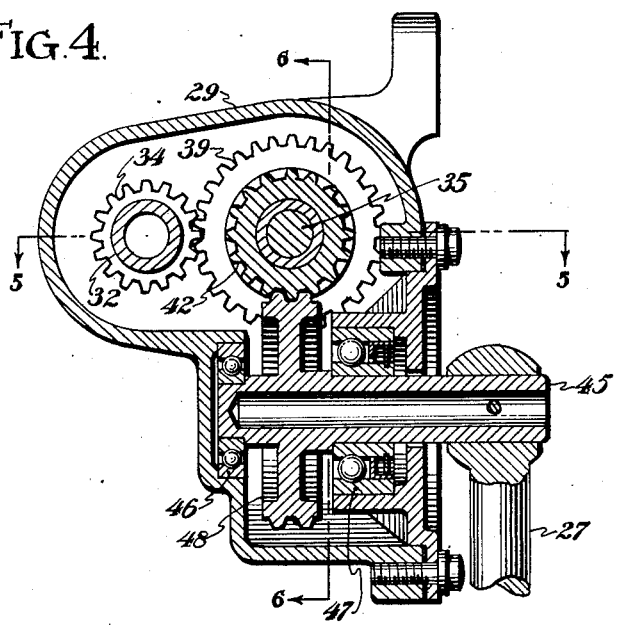
Figure 5:
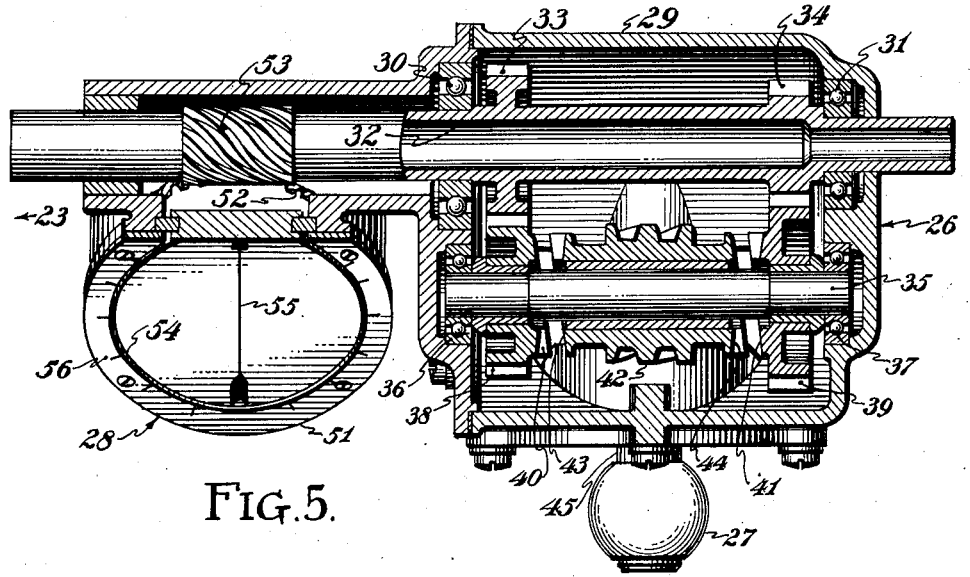

Figs. 3 and 4 are enlarged sections on the lines 3—3 and 4—4, respectively, of Fig. 2;

Fig. 5 is a section on the line 5—5 of Fig. 4; and

Figure 6:
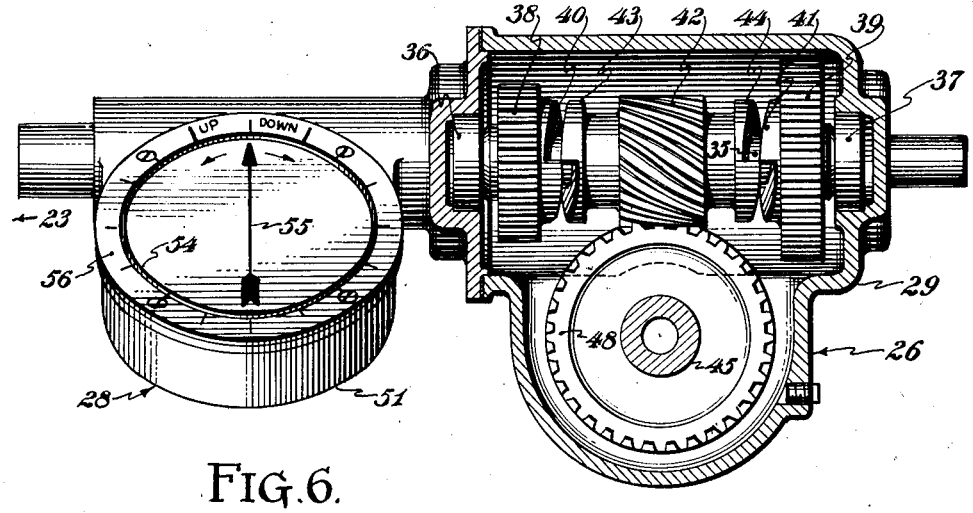

Fig. 6 is a section on the line 6—6 of Fig. 4.

Referring particularly to Figs. 1 and 2, 10 is an airplane fuselage having a skeleton structure 11 carrying vertically aligned bearing elements 12 and 13, in which elements is pivoted a lead screw 14. A nut 15, translatable along the lead screw, carries a fitting to which a landing gear strut 16 is pivoted. Upon turning of the lead screw 14, the nut 15 is translated therealong, simultaneously moving the landing gear strut 16 and other landing gear members 17 and 18, which are attached thereto and to the fuselage, in a manner well known in the art. A lead screw 14 may be provided, as is well known, for each side of the landing gear, the second screw in this showing being designated 14'. At the lower end of each lead screw, a right-angled bevel gear drive 19 is provided, from each of which shafts 20 extend inwardly to a gear box 21. A substantially vertical shaft 22 enters the gear box and is drivably connected with the shafts 20. The shaft 22, in turn, is drivably connected to a rearwardly extending horizontal shaft 23, by means of a bevel gear drive unit 24. The shaft 23, which may have a universal joint 25 intermediate its length, terminates in a driving mechanism generally designated as 26, to which a handle 27, or alternatively, a reversible power means, is attached. An indicating device 28 is preferably located adjacent the mechanism 26, for showing the state of extension or retraction of the landing gear. Generally speaking, turning of the crank 27 in one direction will effect extension of the landing gear, while turning the crank in the opposite direction will effect retraction thereof.

The indicating device 28 and the driving mechanism 26 will now be described in detail, and reference may be made to Figs. 3 to 6, inclusive. The mechanism 26 comprises a housing 29 carrying bearings 30 and 31 for supporting an extension 32 of the shaft 23. Said extension is provided with gears 33 and 34 rigidly mounted thereon, the gear 33 being of relatively large diameter, while the gear 34 is of relatively small diameter. A lay shaft 35, parallel to the extension 32 is borne within the housing 29 in bearings 36 and 37. This shaft carries loosely mounted gears 38 and 39 engaging respectively the gears 33 and 34. Obviously, the gear 38 will be relatively small in diameter, while the gear 39 will be relatively large. Each of the gears 38 and 39 carries on its inner face, one element of a one-way dog clutch, such element on the gear 38 being designated as 40, while the clutch element of the gear 39 is designated as 41. Intermediate the gears 38 and 39, and loosely mounted on the lay shaft 35, is a helical or screw gear 42, rotatable and translatable on the lay shaft. Said screw gear carries at one end a one-way clutch element 43 complementary to the clutch element 40, while a clutch element 44 at the opposite end of the gear 42 is engageable with the clutch element 41. The total length of the gear 42 with its clutch elements, is somewhat less than the distance between the clutch elements 40 and 41, so that the gear may slide from one extreme position to the other for engagement of one or the other of the clutch assemblages comprised by the elements 40—43 or 41—44.

A cross shaft 45 is carried in bearings 46 and 47 in the housing 29 and has mounted thereon a worm 48 constantly in mesh with the screw gear 42. The cross shaft 45 extends from the front of the housing to accommodate the crank 27 or other suitable power applying means. The housing 29 is arranged to contain lubricant for flood lubrication, a plug 49 serving to determine the correct oil level. Suitable oil seals are organized in the housing at points where the several shafts extend therefrom.

Operation of the device is as follows:—When the crank 27 is rotated clockwise (referring to Fig. 6), the worm 48 urges the screw gear 42 to rotate away from the observer and to simultaneously translate toward the right. Such movement effects engagement of the clutch elements 41 and 44, turning the large gear 39 away from the observer and rotating the small gear 34. Thus, the extension 32 and the shaft 23 is rotated at relatively high speed; the other gear drives 24, 21 and 19 will be organized to allow extension of the landing gear with the crank turned in a clockwise direction, as above outlined. Obviously, relatively small mechanical advantage is gained in the transmission of motion between the gear 39 and the gear 34.

To effect retraction of the landing gear, the crank 27 is rotated counter-clockwise, which causes the worm 48 to effect translation of the screw gear 42 to the left, simultaneously urging it to rotate toward the observer. Thus, disengagement of the clutch elements 41 and 44 is accomplished, and shortly thereafter, the clutch elements 40 and 43 engage. Continued counter-clockwise rotation of the handle 27 will then turn the gear 38, the gear 33 and the extension 32 to retract the landing gear. Due to the relative sizes of the gears 33 and 38, a slower rotational movement of the extension 32 is effected than would occur if the crank 27 were rotated at substantially the same speed in the opposite direction to extend the landing gear. By the divergent gear ratios for the retractive and extensive rotation of the crank, a greater mechanical advantage is gained when the retractive movement is effected. Thus, with a small amount of effort applied to the crank 27, the landing gear may be retracted gradually and easily. In applying relatively the same amount of effort in the reverse direction, the landing gear may be extended rapidly and, due to the weight thereof acting to extend the gear, extension is accomplished with no greater output of energy than is required for retraction.

In an actual embodiment of the invention, it has been found that, in flight, forty-eight turns of the crank will raise the landing gear in a period of from forty to fifty seconds. Extension of the gear with the device according to this invention, reduces the time required to about twenty seconds, while the number of crank turns required for extension will be also reduced to approximately twenty-four turns. It will be realized that the mechanism disclosed is entirely automatic, and requires no extra control mechanism for shifting gears for retraction or extension of the landing gear.

The indicating device 28 includes a housing 51 containing a worm wheel 52 borne therein and engageable with a worm 53 integral with the extension 32. A dial 54 is mounted rigid with the worm wheel 52, and may have marked thereon an arrow 55 or the like, to show the position of the wheel 52, and hence of the landing gear. The housing 51 may have attached thereto a scaled ring 56 marked with the relative degrees of extension or retraction. The proportions of the worm 53 and the worm wheel 52 will be so arranged that the wheel 52 makes slightly less than one complete revolution between the position of full extension and that of full retraction of the landing gear.

It will be noted in Fig. 3 that the worm wheel 52 and the dial 54 are carried on a spindle 57 engaging the housing 51, said spindle being provided at its exterior end with a suitable nut 58 for anchoring the assembly in place. By removing the nut 58, the dial and worm wheel may be bodily removed from the housing to enable proper setting of the dial upon assembly. With the landing gear in its fully extended position, for instance, the dial and wheel may be removed and turned so that the arrow 55 lies opposite the "down" position, after which the wheel may be engaged with the worm and the nut 58 put in place.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In mechanism for extending and retracting an aircraft landing gear, a pair of spaced rotatable members each having a one-way clutch element, said members being organized for opposite rotation and being geared to said landing gear, a translatable helical gear between said members and having clutch elements engageable with one or the other clutch elements of said rotatable members, and an operating member rotatable in opposite directions and having gear means engageable with said helical gear, initial rotation of said operating member serving to translate said helical gear to effect engagement of complementary clutch elements, while subsequent rotation of said operating member effects rotation of the corresponding rotatable member.

2. In mechanism for extending and retracting an aircraft landing gear, a low speed drive for retracting said landing gear, a high speed drive for extending said landing gear, a common operating member for both said drives, an automatic screw shift means for connecting said member to one or the other of said drives.

3. In mechanism for extending and retracting an aircraft landing gear, a low-speed drive for retracting said landing gear, a high-speed drive for extending said landing gear, an operating member turnable in one direction for extending, and in the other direction for retracting said landing gear, and an automatic screw shift mechanism actuated by the initiation of rotation of said operating member for connecting the corresponding drive thereto.

FREDERICK I. STEELE.